United States Patent

Burton

[11] 3,891,053
[45] June 24, 1975

[54] DOG LADDER FOR BOATS

[76] Inventor: Henry A. Burton, 855 Harrigan Rd., Fallon, Nev. 89406

[22] Filed: Mar. 6, 1974

[21] Appl. No.: 448,558

[52] U.S. Cl. ................... 182/97; 182/194; 182/206
[51] Int. Cl. ........................... E06c 1/08; E06c 7/48
[58] Field of Search ............ 182/97, 194, 206, 207, 182/48, 91, 93; 14/71, 72

[56] References Cited
UNITED STATES PATENTS

| 976,666 | 11/1910 | Lucas | 14/72 |
| 1,714,451 | 5/1929 | Sauvage | 182/194 |
| 2,527,653 | 10/1950 | Pierce | 14/71 |
| 2,641,785 | 6/1953 | Pitts | 14/71 |

*Primary Examiner*—Reinaldo P. Machado
*Attorney, Agent, or Firm*—John J. Leavitt

[57] ABSTRACT

Presented is a ladder adapted to be mounted on a boat to facilitate a dog climbing into the boat from the water.

8 Claims, 10 Drawing Figures

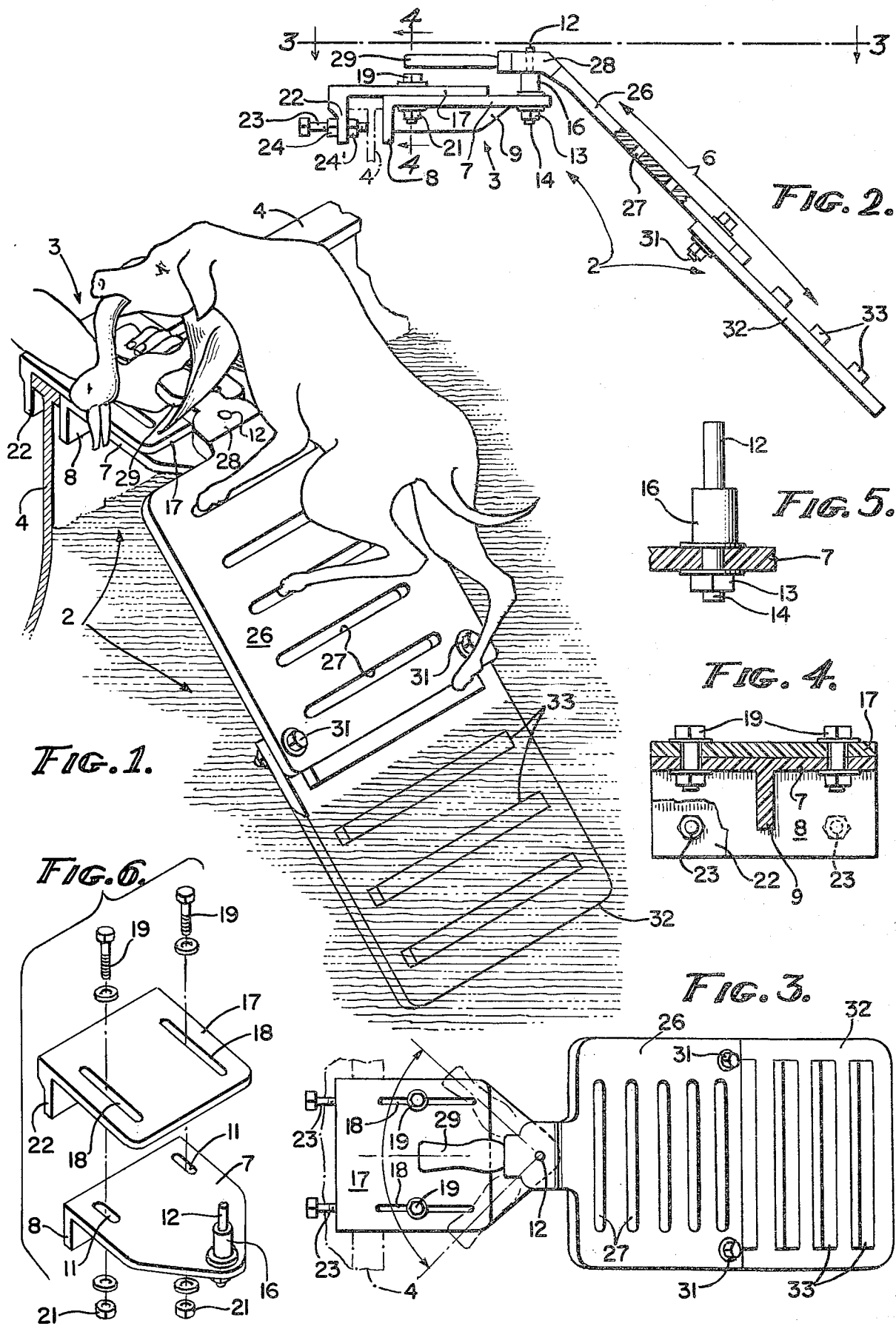

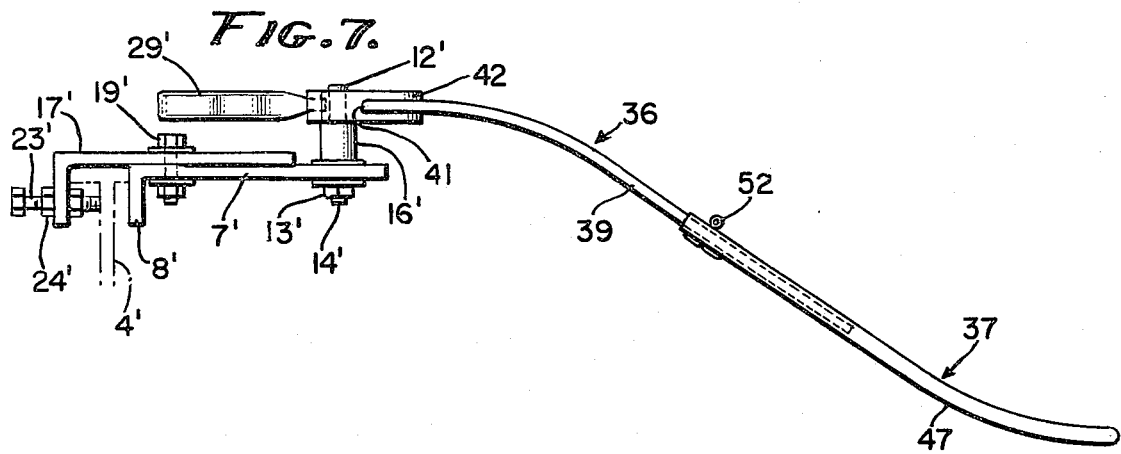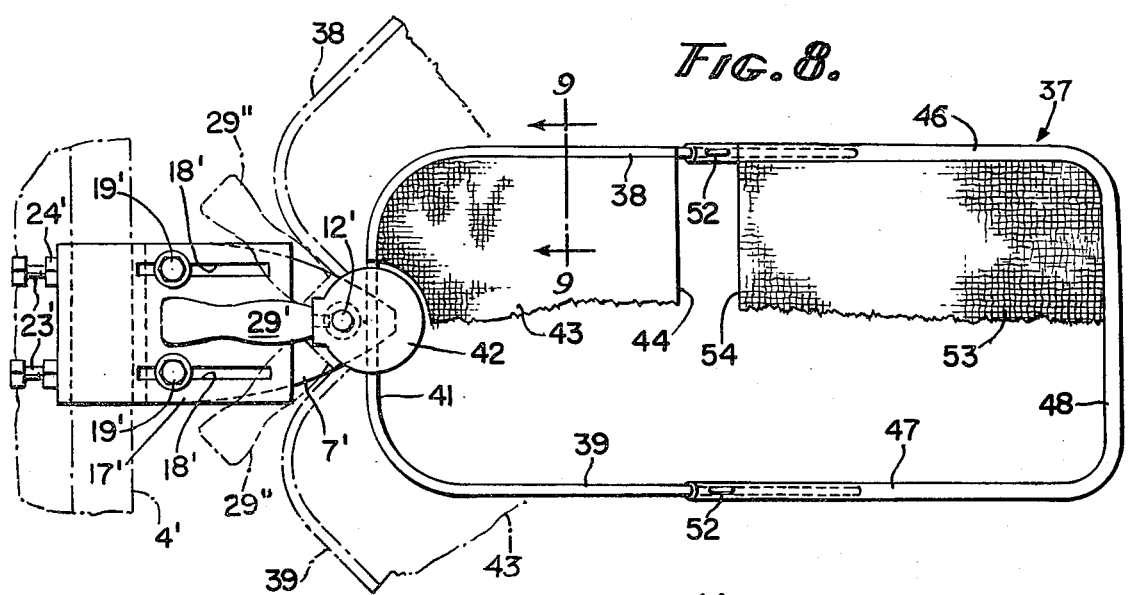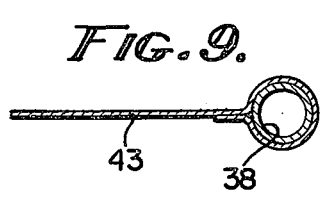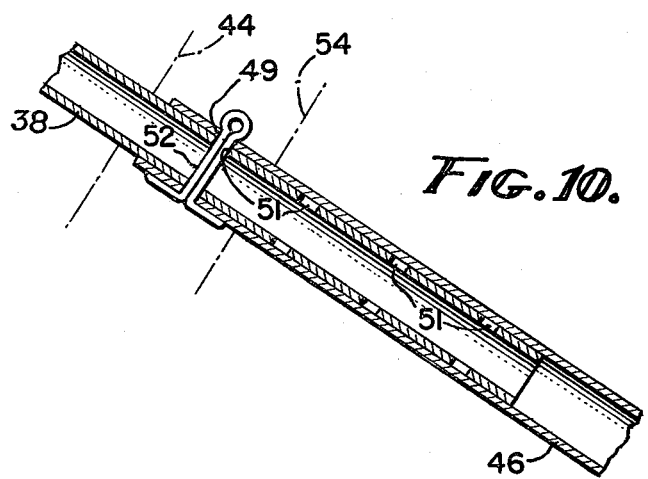

DOG LADDER FOR BOATS

BACKGROUND OF THE INVENTION

This invention relates to ladders or ramps and particularly to the type of ladder or ramp that may be detachably secured to the rail of a small boat, such as a rowboat; and is related to those types of ladders or ramps that are suitable for use by an animal such as a dog to facilitate an animal climbing into the boat from the water.

Hunters, particularly duck hunters that shoot over water, have long been faced with the problem of retrieving the birds that fall into the water. For this purpose, fortunate hunters utilize a "retriever" dog that jumps out of the boat and swims to the floating bird and brings it back to the boat. At this point the hunter is faced by a dilemma. On the one hand, proper training for a retriever instills in the dog a reluctance to release the bird until he is in the boat. On the other hand, the only way that the dog can get into the boat is to be lifted bodily thereinto by the hunter. This requires that the hunter carefully set his gun down which is loaded, where it won't get wet and where it won't discharge inadvertently, kneel in the bottom of the boat, reach over the rail and grab the dog by the scruff of the neck and literally lift him over the rail and into the boat, where he will drop the bird. This is dangerous, uncomfortable to the dog, and exasperating to the hunter, especially if he gets wet. To obviate these disadvantages, one of the objects of the invention is to provide a dog ladder or ramp that may be quickly and easily secured to the boat rail at a point at which the dog may have access to it.

Another object of the invention is the provision of a dog ladder that may be manipulated after attachment to the boat rail so that it may be arranged in the direction from which the dog is swimming.

Still another object of the invention is the provision of a dog ladder for boats which may be quickly and easily detached in whole or in part without disturbing the mounting portion of the ladder where it attaches to the boat rail.

There has always been a problem to effect transition from water into a boat, or from water onto the shore where the water is contained in a receptacle having steep sides, such as a swimming pool. Accordingly, another object of the invention is to provide a ladder structure which may be used as a dog ladder on a boat, or which may be used in conjunction with a swimming pool to facilitate egress from the swimming pool.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

Broadly considered, the invention comprises a ladder structure, either monolithic in form such as might result from molding it in one or two pieces, or lightweight in form such as constructed from appropriate tubing and netting material secured to the tubing. The ladder construction is provided with a mounting portion including a pivot pin, and the ladder per se having an apertured bearing portion adapted to engage the pivot pin so that the ladder may be pivoted within a range of about 180° so that it may be positioned so that the dog can find the ladder easily when he is swimming in with a bird.

BRIEF DESCRIPTION OF THE DRAWINGS

FIG. 1 is a perspective view illustrating the ladder mounted on a boat rail and illustrating a dog climbing into the boat over the ladder.

FIG. 2 is a side elevational view of the ladder assembly, a portion of the structure being broken away to reveal the construction.

FIG. 3 is a plan view of the ladder assembly, different positions of the ladder handle being illustrated in broken lines.

FIG. 4 is a vertical cross-sectional view taken in the plane indicated by the line 4—4 in FIG. 2.

FIG. 5 is a fragmentary vertical sectional view partly in elevation illustrating the pivot pin on the ladder assembly.

FIG. 6 is a fragmentary perspective view in exploded form illustrating the adjustable clamp means for securing the ladder assembly to a boat rail.

FIG. 7 is a view similar to FIG. 2 but showing in elevation a different embodiment of the ladder assembly.

FIG. 8 is a plan view of the embodiment of the ladder assembly illustrated in FIG. 7.

FIG. 9 is a fragmentary sectional view illustrating the manner in which the fabric is attached to the tubular rails of the ladder assembly.

FIG. 10 is a fragmentary sectional view illustrating the manner of telescopic adjustment of the upper and lower portions of the ladder assembly.

DESCRIPTION OF THE PREFERRED EMBODIMENTS

In terms of greater detail, and referring specifically to the embodiment of the invention illustrated in FIGS. 1 through 6, the ladder assembly is designated generally by the numeral 2, and includes an adjustable clamp portion 3 adapted to clamp the ladder assembly to a supporting structure such as the rail 4 of a boat. A ramp portion 6 is adapted to be pivotally mounted on the mounting portion 3 and to extend into the water when mounted on the rail of a boat.

The adjustable clamp 3 comprises a relatively flat base plate 7 having a flange 8 thereon extending perpendicularly to the plate 7 and reinforced by a rib 9. The base plate is provided with a pair of elongated slots 11, and the end of the base plate remote from the downwardly or perpendicular flange 8 is generally triangular in its configuration and is provided with a pivot pin 12 suitably secured in an aperture bored in the base plate. The pivot pin 12 is locked to the base plate by an appropriate nut 13 threaded to the shank 14 of the pivot pin. A spacer 16 is mounted on the pivot pin 12 for purposes which will hereinafter be explained.

The clamp plate 17 working in conjunction with base plate 7 to form the clamp assembly is generally rectangular in its configuration, and is provided with a pair of spaced elongated slots 18 which in lateral spacing correspond to the lateral spacing of the elongated slots 11 in base plate 7. When the clamp plate 17 is superimposed over the base plate, cap screws 19 extend through the slots 17–11 on both sides of the clamp and base plates 17 and 7, and are secured on the underside by appropriate nuts 21. The clamp plate is also provided with a perpendicular flange 22 which extends substantially parallel to the flange 8 on the base plate, with the space between the flange 22 and the flange 8 being adjustable by moving the clamp plate in relation to the base plate in the direction of the longitudinal dimension of the slots 18. A pair of cap screws 23 suitably locked by nuts 24 and 24' provide a means for capturing the rail 4 of a boat or some other supporting structure between the parallel flanges 22 and 8 as illustrated in the drawings. It will of course be understood that once the spacing between the flanges has been selected, the cap screws 19 with attendant nuts 21 are tightened so as to clamp the clamp plate 17 immovably with respect to the base plate.

The ladder ramp 6 is preferably constructed as a two-part assembly including an upper portion 26 having elongated slots 27 formed therein and extending transversely across the ramp portion and being spaced apart in parallel relationship so that the slots form a toe or finger hold for a dog or person attempting to climb the ramp. Adjacent its upper end, the upper portion 26 is provided with an angularly disposed bearing portion 28 apertured as shown to receive therethrough the pivot portion 12 of the pivot pin. Attached to the bearing portion 28 is a short handle 29 which may be used by the boat operator to pivot the ladder from one side of the other as illustrated in broken lines in FIG. 3 so as to place the ladder or ramp in position to be climbed by the dog.

As illustrated in FIGS. 1 and 2, adjacent its lowermost end, the upper portion 26 of the ramp is provided with a pair of apertures adjacent lateral edges thereof, the apertures being suitable to receive bolts 31 which securely attach to the upper portion 26 of the ramp a lower ramp portion 32 provided with cleats 33 on the surface thereof which function in the same manner as the slots 27 in the upper ramp portion. The lower ramp portion effectively extends the length of the ladder so that it projects down into the water to a greater depth. It will of course be understood that despite the fact that the extended ramp, including both upper and lower portions, extends below the surface of the water for a considerable distance, the handle 29 may still be manipulated to pivot the entire ramp assembly from one position to another so as to position the ramp to be easily claimed by a dog swimming toward the boat. It has been found that as soon as the dog encounters the ladder under his paws, he scrambles on board very quickly, thus eliminating the necessity of literally hoisting the dog into the boat, with all its attendant disadvantages.

In the embodiment of the invention illustrated in FIGS. 7 through 10, a similar clamp arrangement has been used, and corresponding primed reference numbers have been used to designate corresponding elements of the two embodiments. The essential difference between the construction of this embodiment and the embodiment illustrated in FIGS. 1 through 6, is that here the ladder ramp is constructed from lightweight aluminum or other appropriate tubing to provide an upper ramp portion designated generally by the numeral 36 and a lower ramp portion designated generally by the numeral 37. The upper ramp portion constitutes a U-shaped frame fabricated from tubing approximately three-fourth inch in diameter, to provide lateral legs 38 and 39 joined by a cross member 41, the midsection 42 of which is appropriately captured in a bearing member 42, apertured at 43 to receive the pivot pin 12' therethrough. Suitably secured to the frame members 38-41 is an appropriate netting material 43 which may be fabricated from natural or synthetic fibres, or which may constitute a suitable wire fabric. It should be noted that the lowermost edge 44 of this fabric does not extend to the lowermost ends of the tubular members 38 and 39 for reasons which will hereinafter be explained.

The lowermost ramp portion 37 is also fabricated from a generally U-shaped frame having lateral legs 46 and 47 connected by a cross member 48. This tubing, while being of the same material as the upper ramp portion, is somewhat larger in diameter so that the leg portions 46 snd 47 of the lower ramp portion may telescopically accommodate the leg portions 38 and 39 of the upper ramp portion as illustrated in FIG. 10. To permit a measure of adjustment, a single aperture 49 is provided in the legs 46 and 47 adjacent there ends remote from the cross member 48, and a plurality of apertures 51 are provided in the end portions in the end portions of the legs 38 and 39 beyond the edge 44 of the fabric. As illustrated in FIG. 10, when the tubular legs are telescoped, a measure of adjustment is provided to either lengthen or shorten the ramp. Once adjusted for length, the telescoped legs are stabilized by inserting an appropriate cotter pin 52 through corresponding apertures 49 and 51 in the telescoped leg portions of the tubular frame.

As with the upper ramp portion, the frame 46-48 constituting the lower ramp support portion is provided with a fabric covering 53 suitably attached to the tubular members 46-48 as illustrated in FIG. 9. The upper edge portion 54 of this fabric covering lies substantially parallel to the lower edge 44 of the fabric mounted on the upper ramp portion and spaced only a short distance therefrom when the frames are telescoped. It has been found that the discontinuity of the fabric at a point approximately near the midpoint of the ramp does not constitute a disadvantage.

One of the advantages of the embodiment illustrated in FIGS. 7 through 10, is that when the ramp is turned in so that it substantially parallels the side of the boat to which it is attached, the ramp does not constitute too much of an impediment to forward movement of the boat. It has been found that because of the facility of retrieving birds shot down over water, a bag limit may be secured in a much shorter time than is ordinarily the case. Additionally, it eliminates the discomfort to both hunter and dog which is entailed in the conventional method of hoisting the dog over the rail of the boat.

Having thus described the invention what is claimed to be new and novel and sought to be protected by letters patent is as follows:

1. A ladder assembly adapted to facilitate egress from a body of water onto a structure on which the ladder is supported, comprising:
   a. an adjustable base member detachably mountable on a supporting structure;
   b. pivot means mounted on the base member;
   c. a ramp assembly pivotally mounted on said pivot pin and adapted to extend at a relatively steep angle downwardly from said base member;
   d. said base member including a pair of relatively adjustable base and clamp plates including parallel flanges adjustable to receive a supporting structure; and e. adjustable means mounted on one of said flanges and adapted to impinge against said supporting structure to clamp the base member thereto.

2. The combination according to claim 1, in which said ramp is elongated and includes an upper portion and a lower portion, and means disposed therebetween for detachably securing the lower portion to the upper portion.

3. The combination according to claim 1, in which said ramp constitutes a flat monolithic panel having transversely extending slots therein.

4. The combination according to claim 1, in which said ramp is fabricated from a pair of generally U-shaped tubular frames telescopically interengaged and adjustable to provide a ramp of varying length, and a fabric covering on said ramp to provide traction for a dog climbing the ramp.

5. The combination according to claim 4, in which said ramp includes upper and lower portions, said upper portion being fabricated from a generally U-shaped frame having a fabric cover thereon and being pivoted on said base member so that the free ends of said U-shaped frame extend downwardly therefrom, and said lower ramp portion is fabricated from a generally U-shaped frame having a fabric cover, the free ends of the U-shaped frame extending upwardly and telescopically receiving the free ends of the upper U-shaped frame, and means interposed between the free ends of said telescopically associated U-shaped frames to lock the frames together.

6. The combination according to claim 4, in which said fabric may be fabricated from natural or synthetic fibres or from an appropriate metallic fabric.

7. A ladder assembly adapted to facilitate egress from a body of water onto a structure on which the ladder is supported, comprising:
   a. an adjustable base member detachably mountable on a supporting structure;
   b. pivot means mounted on the base member;
   c. a ramp assembly pivotally mounted on said pivot pin and adapted to extend at a relatively steep angle downwardly from said base member;
   d. said ramp assembly including a bearing member disposed between said pivot pin and said ramp, and
   e. a handle mounted on said bearing means and adapted for lateral translation to adjust the position of said ramp.

8. A ladder assembly adapted to facilitate egress from a body of water onto a structure on which the ladder is supported, comprising:
   a. an adjustable base member detachably mountable on a supporting structure;
   b. pivot means mounted on the base member; and
   c. a ramp assembly pivotally mounted on said pivot pin and adapted to extend at a relatively steep angle downwardly from said base member;
   d. said ramp comprising an upper portion constituting a flat panel having slots therein and a lower portion constituting a flat panel having cleats thereon at spaced intervals generally corresponding to the spacing between said slots in the upper portion so as to provide traction for a dog climbing the ramp.

* * * * *